(12) United States Patent
Higaki

(10) Patent No.: US 11,348,205 B2
(45) Date of Patent: May 31, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yoshinari Higaki, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 16/909,876

(22) Filed: Jun. 23, 2020

(65) Prior Publication Data
US 2020/0410645 A1    Dec. 31, 2020

(30) Foreign Application Priority Data

Jun. 26, 2019  (JP) .............................. JP2019-118376

(51) Int. Cl.
*G06T 5/00* (2006.01)
*G06T 5/20* (2006.01)

(52) U.S. Cl.
CPC .............. *G06T 5/002* (2013.01); *G06T 5/003* (2013.01); *G06T 5/20* (2013.01)

(58) Field of Classification Search
CPC .......... G06T 5/002; G06T 5/20; G06T 5/003; G06T 5/10; G06T 5/50; G06T 5/007; G06T 5/40; G06T 5/009; G06T 5/008; G06T 2207/20056; G06T 2207/30192; G06T 5/001; G06T 5/005; G06T 2207/30212; G06T 2207/30232; G06T 2207/10024; G06T 2207/10016; G06T 2207/20016; G06T 2207/20021; G06T 2207/20221; G06T 2207/10032; G06T 2207/20012; G06T 2207/20024; G06T 2207/20182; G06T 2207/20201; G06T 2207/30181;
(Continued)

(56) References Cited

U.S. PATENT DOCUMENTS 5,841,911 A * 11/1998 Kopeika ................. G06T 5/003
                                                      382/254
6,459,818 B1 * 10/2002 George .................. G06T 5/003
                                                      382/254
(Continued)

OTHER PUBLICATIONS

Image Reconstruction Program by Speckle Masking Method, Technical Reports from Kwasan and Hida Observatories Graduate School of Science, Kyoto University, Jan. 25, 2014, 23 pages, vol. 2-1.

*Primary Examiner* — Jose L Couso
(74) *Attorney, Agent, or Firm* — Canon U.S.A., Inc. IP Division

(57) ABSTRACT

An image processing apparatus includes an acquisition unit configured to acquire a parameter about atmospheric fluctuation, a determination unit configured to determine a method and condition for noise reduction processing, a processing unit configured to perform, on input image data, noise reduction processing corresponding to the determined method and condition for noise reduction processing, and a generation unit configured to generate image data corrected by a speckle imaging method, based on a plurality of pieces of image data on which the noise reduction processing has been performed. The determination unit determines the method and condition for noise reduction processing based on the parameter.

13 Claims, 10 Drawing Sheets

(58) Field of Classification Search
CPC . G06T 2207/10044; G06T 7/136; G06T 7/90; G06T 2207/20216; G06T 2207/20224; G06T 2207/20228; G06K 9/4661; G06K 9/46; G06K 9/4642; G06K 9/4652; G06K 9/623; H04N 1/4092; H04N 1/56; H04N 5/21; H04N 5/357; H04N 5/213; G01N 15/0211; G01N 15/0227; G01N 2021/473; G01N 2021/4733; G01N 21/47
See application file for complete search history.

(56) References Cited

U.S. PATENT DOCUMENTS

| | | | | |
|---|---|---|---|---|
| 9,811,884 | B2* | 11/2017 | Foi | G06T 5/002 |
| 10,719,924 | B2* | 7/2020 | Fluckiger | G06T 5/001 |
| 10,748,252 | B2* | 8/2020 | Derndinger | G06T 5/10 |
| 11,145,033 | B2* | 10/2021 | Derndinger | H04N 5/23229 |
| 11,201,989 | B2* | 12/2021 | Paul | G06T 5/50 |
| 2004/0005098 | A1 | 1/2004 | Carrano et al. | |
| 2009/0103832 | A1* | 4/2009 | Ortiz | G06T 5/003 382/280 |
| 2010/0252736 | A1* | 10/2010 | Thorne | H04N 5/33 250/332 |
| 2012/0093433 | A1* | 4/2012 | Gupta | G06T 5/007 382/260 |
| 2012/0288212 | A1* | 11/2012 | Arrasmith | G06T 5/50 382/260 |
| 2013/0242129 | A1* | 9/2013 | Harmeling | H04N 5/23229 348/222.1 |
| 2014/0270565 | A1* | 9/2014 | Poyneer | G06T 5/003 382/260 |
| 2015/0332437 | A1* | 11/2015 | Kondou | G06K 9/4661 382/190 |
| 2015/0332443 | A1* | 11/2015 | Yamada | G06T 5/009 382/274 |
| 2017/0206690 | A1* | 7/2017 | Itoh | G06T 7/90 |
| 2018/0038789 | A1* | 2/2018 | Itoh | G06T 5/003 |
| 2018/0061024 | A1* | 3/2018 | Koizumi | G06T 5/003 |
| 2018/0130189 | A1* | 5/2018 | Kaneko | H04N 1/56 |
| 2018/0249100 | A1* | 8/2018 | Watson | H04N 5/213 |
| 2018/0324359 | A1* | 11/2018 | Pan | H04N 5/23267 |
| 2019/0172184 | A1* | 6/2019 | Pan | G06T 5/50 |
| 2019/0295234 | A1* | 9/2019 | Takikawa | G06T 5/50 |
| 2020/0150266 | A1* | 5/2020 | Cossairt | H04N 5/213 |

* cited by examiner

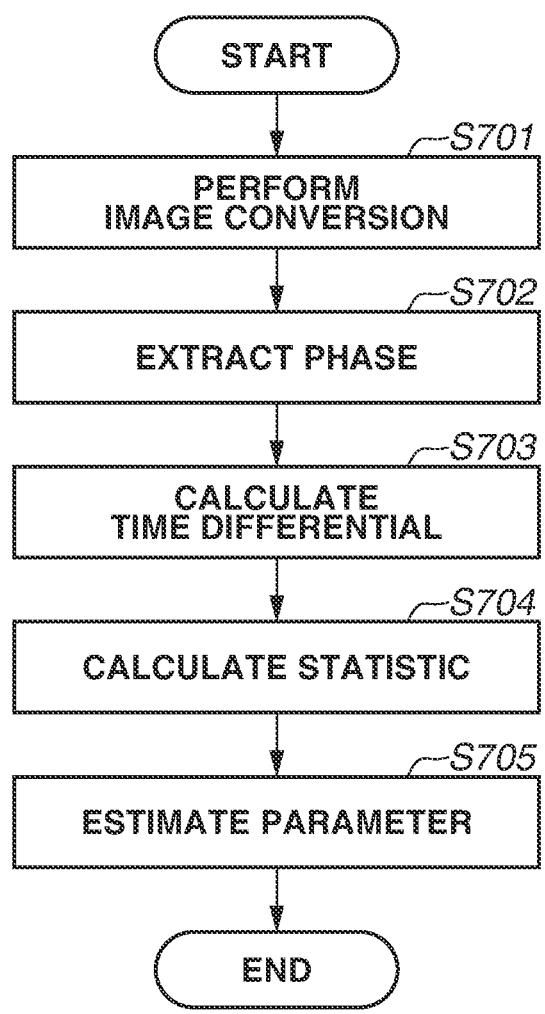

IMAGE PROCESSING APPARATUS, IMAGE PROCESSING METHOD, AND STORAGE MEDIUM

BACKGROUND OF THE INVENTION

Field of the Invention

The present invention relates to an image processing technology for processing a captured image.

Description of the Related Art

In conventional systems such as monitoring camera systems a technology for correcting image degradation due to atmospheric fluctuation (hereinafter referred to as fluctuation correction) is used. The atmospheric fluctuation refers to a natural phenomenon in which a refractive index changes spatially and temporally due to air turbulence and temperature difference. The atmospheric fluctuation is also called heat haze. The atmospheric fluctuation causes refraction or phase fluctuations of light. As a result, particularly in a case where an image of a distant object is captured using a telephoto lens, temporally-changing blurring and deformation (hereinafter referred to as fluctuation) occur in the image of the object. Such degradation in the image greatly reduces the visibility of the object, and thus it is desirable to remove the degradation.

Here, a speckle imaging method is known as a technique for generating an image by simultaneously reducing blurring and deformation from an image of a plurality of frames. In the following description, for example, pieces of image data arranged in time series and forming a moving image will be referred to as a frame. The speckle imaging method is a technique originally developed in the field of astronomy, and estimates the amplitude component and the phase component of the Fourier spectrum of a reconstructed image independently of each other. The amplitude component is estimated by calculating the average of the power spectrums of input frames, and applying a filter that amplifies the high frequency component determined based on the optical transfer function of an optical system of an image capturing apparatus to the calculated average. On the other hand, the phase component is obtained by sequentially estimating the phase value of the high frequency component using a known phase value of the low frequency component based on the bispectrum of an input image. United States Patent Application Publication No. 2004/0005098 discusses a technique for applying the speckle imaging method to fluctuation correction.

When the speckle imaging method is used, there arises such an issue that noise included in an input frame is amplified and this reduces the image quality of a reconstructed image.

SUMMARY OF THE INVENTION

According to an aspect of the present invention, an image processing apparatus includes an acquisition unit configured to acquire a parameter about atmospheric fluctuation, a determination unit configured to determine a method and condition for noise reduction processing, a processing unit configured to perform, on input image data, noise reduction processing corresponding to the determined method and condition for noise reduction processing, and a generation unit configured to generate image data corrected by a speckle imaging method, based on a plurality of pieces of image data on which the noise reduction processing has been performed. The determination unit determines the method and condition for noise reduction processing based on the parameter.

Further features of the present invention will become apparent from the following description of exemplary embodiments with reference to the attached drawings.

BRIEF DESCRIPTION OF THE DRAWINGS

FIG. 7 is a flowchart illustrating processing in the parameter acquisition unit according to the first exemplary embodiment.

DESCRIPTION OF THE EMBODIMENTS

Exemplary embodiments will be described in detail below with reference to the attached drawings. The following exemplary embodiments are not intended to limit the present invention.

Figure 1:
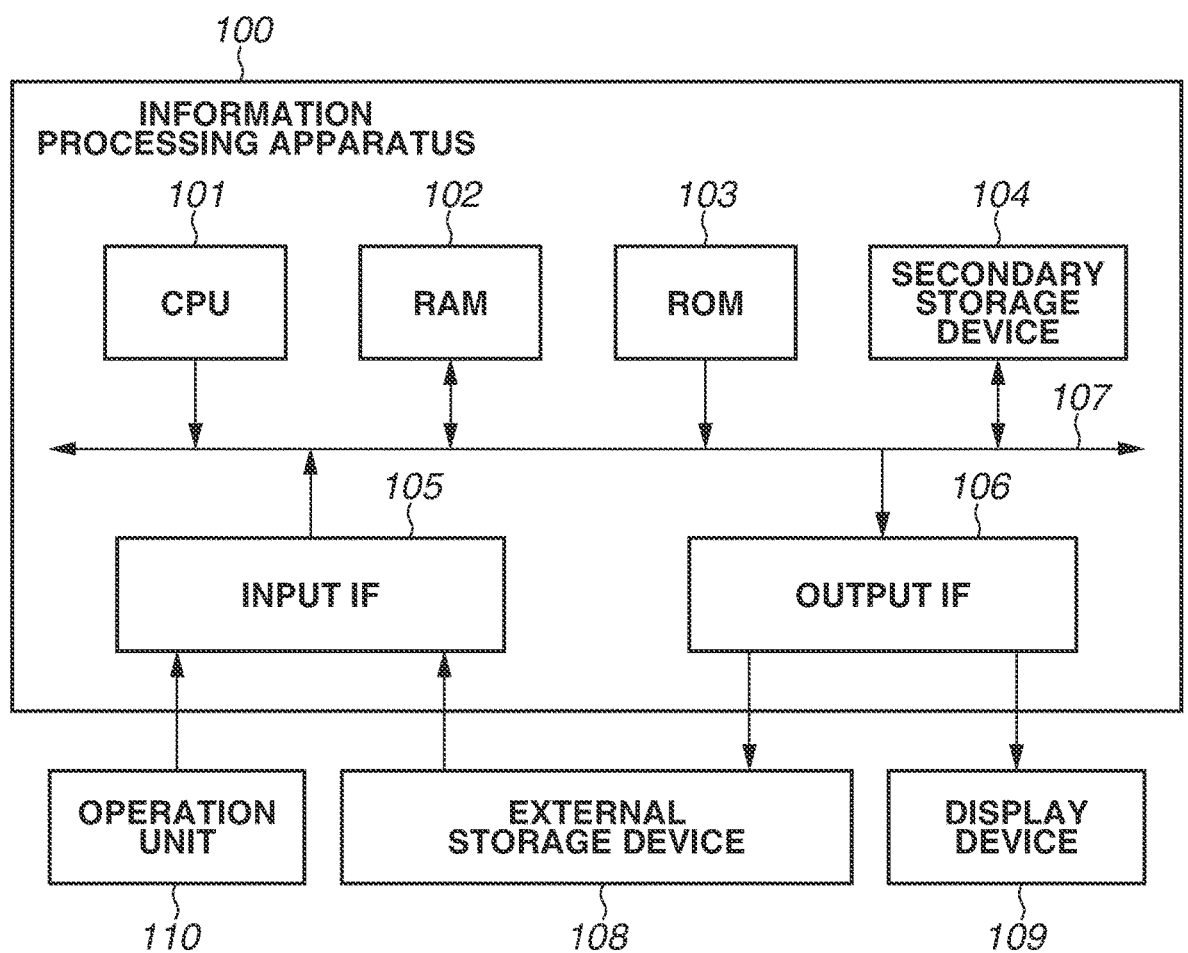
FIG. 1 is a diagram illustrating a configuration example of an information processing apparatus according to an exemplary embodiment.

FIG. 1 is a diagram schematically illustrating a configuration of an information processing apparatus 100 as an example in which an image processing apparatus is applied. The information processing apparatus 100 according to an exemplary embodiment includes a central processing unit (CPU) 101, a random access memory (RAM) 102, a read only memory (ROM) 103, a secondary storage device 104, an input interface (IF) 105, and an output IF 106 as components. The components of the information processing apparatus 100 are connected to each other via a system bus 107. The information processing apparatus 100 is connected to an external storage device 108 and an operation unit 110 via the input IF 105. The information processing apparatus 100 is also connected to the external storage device 108 and a display device 109 via the output IF 106.

The CPU 101 executes a program stored in the ROM 103 using the RAM 102 as work memory, and thereby comprehensively controls the components via the system bus 107. Various kinds of processing to be described below are thereby executed. The secondary storage device 104 stores various data to be handled in the information processing apparatus 100. In the present exemplary embodiment, for example, a hard disk drive (HDD) is used as the secondary storage device 104. Other than the HDD, various storage devices including an optical disk drive and a flash memory can be used for the secondary storage device 104. The CPU 101 writes data into the secondary storage device 104 and reads out data stored in the secondary storage device 104 via the system bus 107.

The input IF 105 is, for example, a serial bus interface compliant with a standard such as Universal Serial Bus (USB) and Institute of Electrical and Electronics Engineers (IEEE) 1394. The information processing apparatus 100 inputs data and commands to an external apparatus (not illustrated) via the input IF 105. In the present exemplary embodiment, the information processing apparatus 100 acquires data from the external storage device 108 via the input IF 105. The external storage device 108 includes, for example, a hard disk, a memory card such as a Compact-Flash (CF) (registered trademark) card or Secure Digital (SD) card, or a USB memory, as a storage medium. Further, in the present exemplary embodiment, the information processing apparatus 100 acquires an instruction input into the operation unit 110 by a user, via the input IF 105. The operation unit 110 is an input device including a mouse and a keyboard, and acquires an instruction input by the user.

The output IF 106 is a serial bus interface compliant with a standard such as USB or IEEE 1394, as with the input IF 105. The output IF 106 may be a video output terminal such as Digital Video Interface (DVI) or High-Definition Multimedia Interface (HDMI) (registered trademark). The information processing apparatus 100 outputs data to an external apparatus (not illustrated) via the output IF 106. In the present exemplary embodiment, the information processing apparatus 100 outputs data (e.g., image data) processed by the CPU 101 to the display device 109 (display device for displaying various images, such as a liquid crystal display) via the output IF 106. Although the information processing apparatus 100 includes components other than the above-described components, the description thereof will be omitted here.

Image processing to be performed by the information processing apparatus 100 according to a first exemplary embodiment will be described below. Image data to be input into the information processing apparatus 100 according to the present exemplary embodiment is image data acquired by an image capturing apparatus such as a monitoring camera. The information processing apparatus 100 according to the present exemplary embodiment acquires a parameter that can affect atmospheric fluctuation, determines a method and condition for noise reduction processing based on the acquired parameter, and executes, on the image data, noise reduction processing according to the determined method and condition for noise reduction processing. Further, the information processing apparatus 100 according to the present exemplary embodiment generates output image data in which the atmospheric fluctuation is corrected using a speckle imaging method, based on the image data formed of a plurality of frames and subjected to the noise reduction processing.

Figure 2:
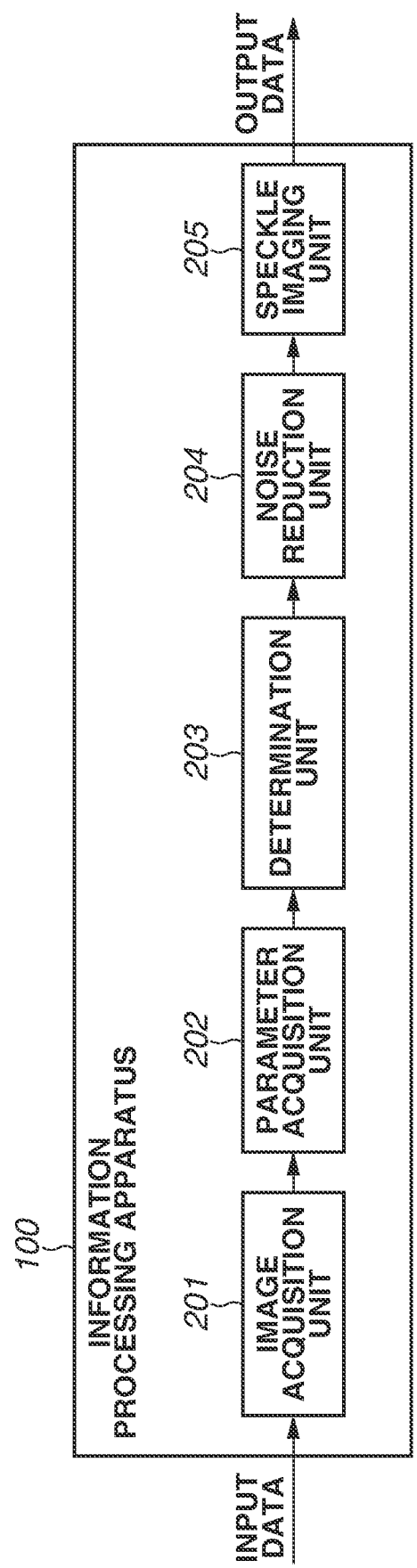
FIG. 2 is a diagram illustrating a functional configuration of the information processing apparatus.

FIG. 2 is a functional block diagram illustrating a functional configuration of the information processing apparatus 100 according to the present exemplary embodiment. The information processing apparatus 100 has functions as an image acquisition unit 201, a parameter acquisition unit 202, a determination unit 203, a noise reduction unit 204, and a speckle imaging unit 205 as illustrated in FIG. 2. Processing in each of the units of the information processing apparatus 100 illustrated in FIG. 2 will be described in detail below.

Figure 3:
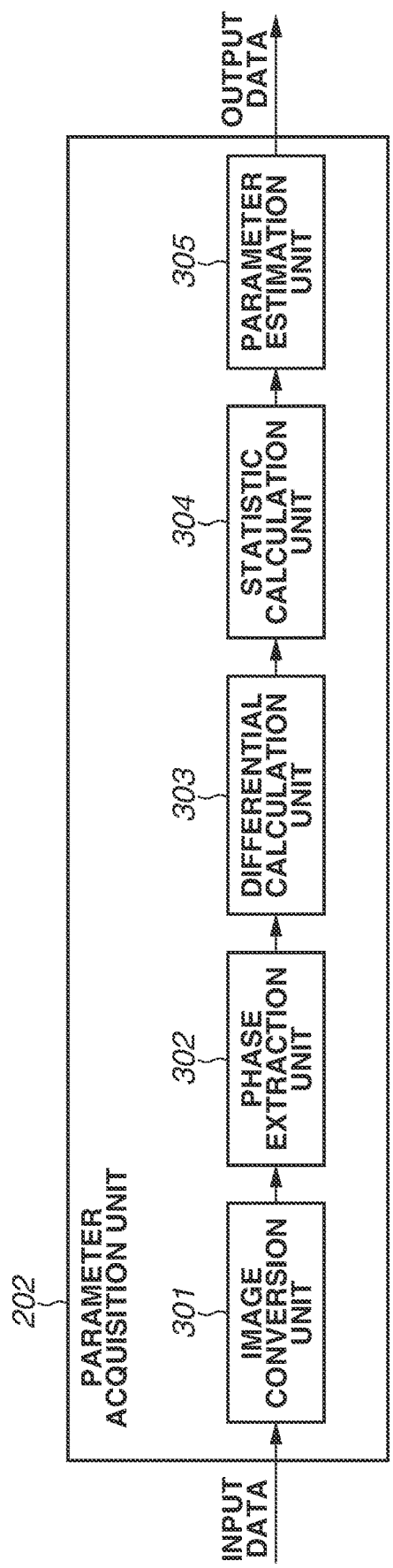
FIG. 3 is a diagram illustrating a functional configuration of a parameter acquisition unit according to a first exemplary embodiment.

In the first exemplary embodiment, the parameter acquisition unit 202 has functions as an image conversion unit 301, a phase extraction unit 302, a differential calculation unit 303, a statistic calculation unit 304, and a parameter estimation unit 305, as illustrated in FIG. 3. Processing in each of the units of the parameter acquisition unit 202 illustrated in FIG. 3 will be described in detail below.

Figure 4:
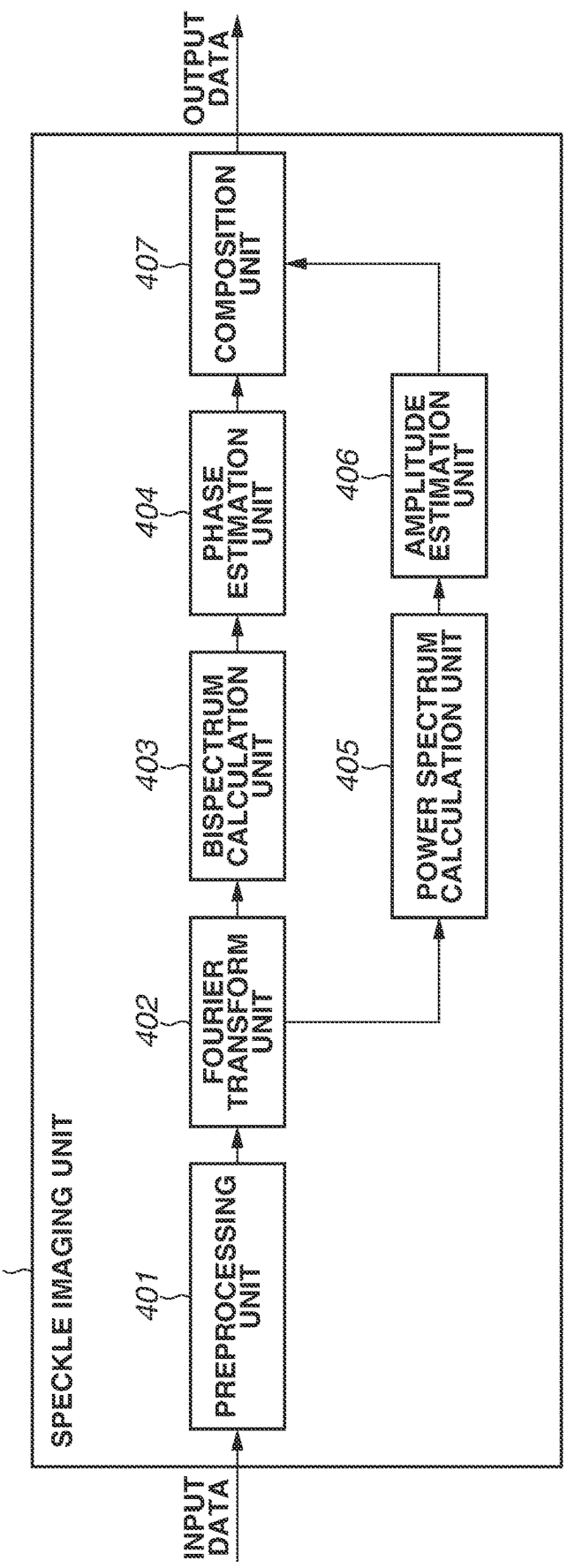
FIG. 4 is a diagram illustrating a functional configuration of a speckle imaging unit.

The speckle imaging unit 205 has functions as a preprocessing unit 401, a Fourier transform unit 402, a bispectrum calculation unit 403, a phase estimation unit 404, a power spectrum calculation unit 405, an amplitude estimation unit 406, and a composition unit 407, as illustrated in FIG. 4. Processing in each of the units of the speckle imaging unit 205 illustrated in FIG. 4 will be described in detail below.

The CPU 101 reads a program stored in the ROM 103, and executes the read program, so that the function in each of the units illustrated in FIG. 2 to FIG. 4 is implemented. The information processing apparatus 100 may include a dedicated processing circuit corresponding to each of the units.

Figure 5:
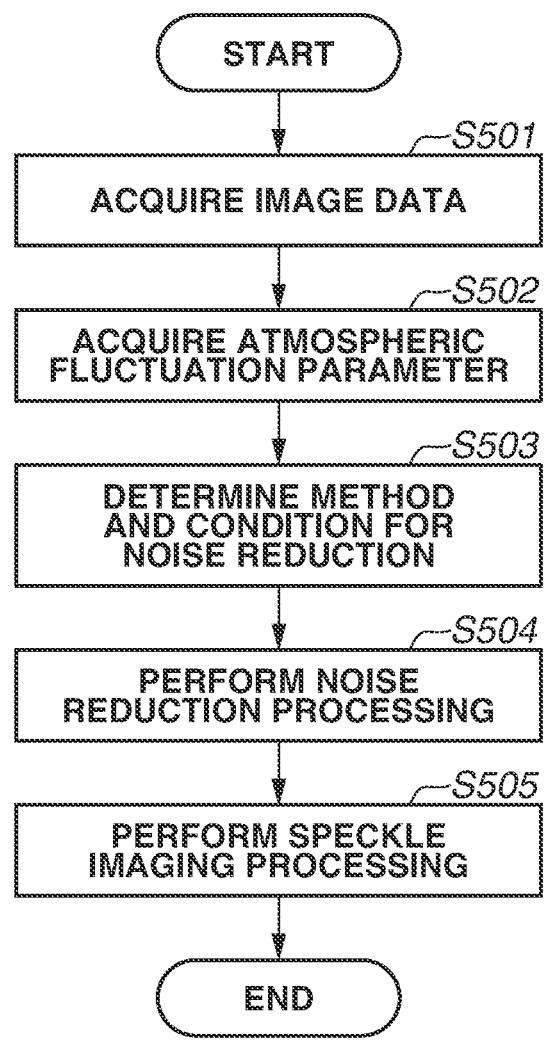
FIG. 5 is a flowchart illustrating processing in the information processing apparatus.

FIG. 5 is a flowchart illustrating a flow of processing in the information processing apparatus 100 according to the first exemplary embodiment. The function of each of the units illustrated in FIG. 2 to FIG. 4 will be described below with reference to the flowchart in FIG. 5.

First, in step S501, the image acquisition unit 201 acquires image data consisting of a plurality of frames that is to be processed by the information processing apparatus 100 according to the present exemplary embodiment. The image data acquired in this step is, for example, data of an image for each of the frames captured by the image capturing apparatus.

Next, in step S502, the parameter acquisition unit 202 acquires a parameter that affects atmospheric fluctuation (an atmospheric fluctuation parameter) in imaging. In the present exemplary embodiment, the acquired atmospheric fluctuation parameter is, specifically, one or more pieces of information such as a wind velocity, a temperature, a geographic environment, and a season in a place where the images are captured by the image capturing apparatus, as well as the imaging time of the captured image. In other words, the image data acquired by the image acquisition unit 201 is data of an image for each of the frames captured by the image capturing apparatus, and, in this data, deformation and blurring often change due to the atmospheric fluctuation that changes depending on factors such as the wind velocity, temperature, geographic environment, season, and time. Further, due to the influence of the atmospheric fluctuation, local displacement often occurs in the image. Here, the distribution of the local displacement in the image due to the atmospheric fluctuation is approximated by a normal distribution centered at a certain position, and vibrates randomly. For example, when the wind velocity is higher, then the period of the vibration of this displacement is shorter, and the change of the local displacement in the image is greater. In addition, the local displacement in the image by the atmospheric fluctuation may also change due to a meteorological or geographical condition. For example, the local displacement in the image due to the atmospheric fluctuation can increase depending on a weather condition of a high temperature or a geographical condition that a lake or reservoir is present. A flow of processing for acquiring such a parameter that affects the atmospheric fluctuation will be described in detail below.

Next, in step S503, the determination unit 203 determines a method and condition for noise reduction processing based on the information indicating the atmospheric fluctuation parameter transmitted from the parameter acquisition unit 202. The method and condition for noise reduction processing will be described in detail below.

Next, in step S504, the noise reduction unit 204 performs noise reduction processing based on the method and condition for noise reduction processing determined by the determination unit 203, on a plurality of target frames that are target frames to be processed in the noise reduction processing.

In the following, using a case where noise is reduced by performing weighted average processing in image data consisting of a plurality of frames as an example of the noise reduction processing, the processing for determining the method and condition for noise reduction processing by the determination unit 203 and the noise reduction processing by the noise reduction unit 204 will be described.

In the present exemplary embodiment, the noise reduction unit 204 performs a weighted average operation on image data of a target frame and image data of a reference frame, thereby reducing noise in the image of the target frame. The target frame is a frame selected from among a plurality of frames input in time series and to be processed in the noise reduction processing. The reference frame is each of a plurality of frames preceding and following the selected target frame, and is used in the noise reduction processing for the target frame. In the present exemplary embodiment, the number of reference frames can be changed as appropriate, and a weight coefficient to be applied to the image data of each of the target frame and the reference frame when the weighted average processing is performed in the noise reduction processing can be set.

The determination unit 203 according to the present exemplary embodiment determines the number of the reference frames and the weight coefficient as the method and condition for noise reduction processing performed by the noise reduction unit 204, based on the atmospheric fluctuation parameter. The determination unit 203 determines the number of reference frames and the weight coefficient according to the atmospheric fluctuation parameter, using, for example, a method referring to an existing look up table (LUT) or a method applying a model formula.

For example, in a case where the atmospheric fluctuation parameter indicates that the wind velocity is relatively high or the temperature is relatively high, or a geographical environment in which the humidity easily increases due to water vapor from a lake or reservoir, the determination unit 203 determines the number of reference frames so that the number of reference frames is small. For example, in a case where the wind velocity is relatively high, the change of the local displacement in the image is large, i.e., the temporal change in the displacement is large, and blurring thus can occur in the image if the noise reduction processing is performed based on the weighted average of the plurality of frames. As a result, blurring also occurs in a final image obtained by speckle imaging processing to be described below. In a case where the parameter indicates a condition that the temperature is relatively high, or a geographical environment in which the humidity tends to be relatively high due to water vapor from a lake or reservoir, for example, the displacement itself in the image tends to be large. Therefore, the determination unit 203 determines the number of reference frames to be smaller as the temporal change of the local displacement in the image indicated by the atmospheric fluctuation parameter is larger, or the displacement itself in the image is larger. As a result, an image with reduced noise and blurring is obtained after the noise reduction processing by the noise reduction unit 204. Determination regarding whether the wind velocity is relatively high or whether the temperature is relatively high can be made by, for example, making a comparison with a threshold set beforehand.

In contrast, for example, in a case where the atmospheric fluctuation parameter indicates a condition that the wind velocity is relatively low or the temperature is relatively low, or a geographical environment in which a lake or reservoir is not present, the determination unit 203 determines the number of reference frames to be large to some extent. In other words, for example, in a case where the wind velocity is relatively low, the change of the local displacement in the image, i.e., the temporal change of the displacement, is less likely to increase. In addition, in a case where the temperature is relatively low, or in a case of a geographical environment in which the humidity is less likely to become high because of absence of a lake or reservoir, the displacement itself in the image is less likely to increase. Therefore, in a case where the atmospheric fluctuation parameter is a parameter indicating that the temporal change of the local displacement in the image or the displacement itself in the image is not large, the determination unit 203 determines the number of reference frames to be large to some extent. As a result, a high-quality image having a high noise reduction effect is obtained after the noise reduction processing by the noise reduction unit 204. Determination regarding whether the wind velocity is relatively low or whether the temperature is relatively low can be made by, for example, making a comparison with a threshold set beforehand.

Further, the determination unit 203 determines the weight coefficient for the target frame and the reference frame.

Figure 6A:
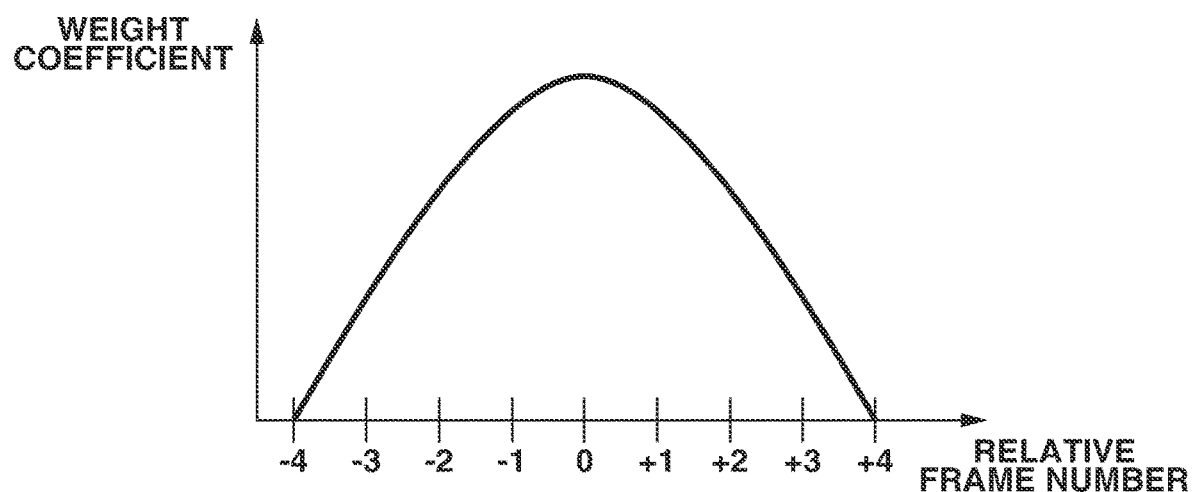
FIGS. 6A and 6B are schematic diagrams each illustrating a weight coefficient in noise reduction processing.
Figure 6B:
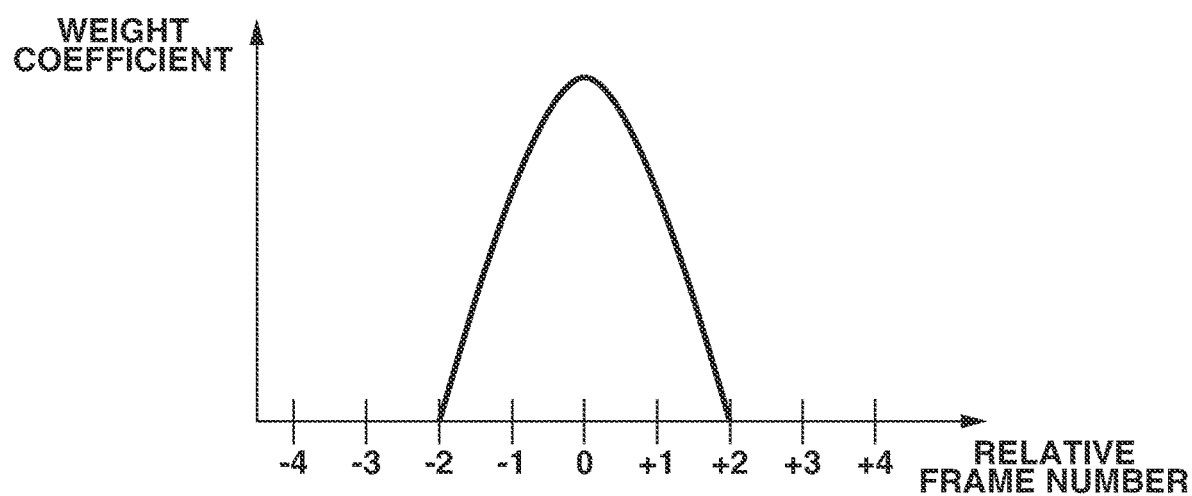

FIGS. 6A and 6B are diagrams illustrating the target frame and the number of reference frames as well as the weight coefficient.

In FIGS. 6A and 6B, a relative frame number represents a relative position of the reference frame in a case where the target frame is 0. For example, the relative frame number of −1 refers to a frame immediately before the target frame. The weight coefficient at each of the relative frame numbers represents the weight coefficient to be applied to the image data of the corresponding frame in weighted averaging.

In a case where the determination unit 203 determines that the atmospheric fluctuation parameter is, for example, a parameter indicating that the wind velocity is relatively low, i.e., the temporal change of the local displacement in the image is less likely to increase, the determination unit 203 determines the weight coefficient illustrated in FIG. 6A with respect to the image data of each of the frames. In the example in FIG. 6A, three frames preceding the target frame and three frames following the target frame are the reference frames. Therefore, the noise reduction unit 204 applies the weight coefficients illustrated in FIG. 6A to those respective frames, and image data obtained by performing weighted averaging on the seven frames consisting of the target frame, the three reference frames preceding the target frame and the three reference frames following the target frames is output as image data of the target frame resulting from the noise reduction processing. In this example, an image obtained after the noise reduction processing is a high-quality image having a high noise reduction effect.

In contrast, in a case where the determination unit 203 determines that the atmospheric fluctuation parameter is, for example, a parameter indicating that the wind velocity is relatively high, i.e., the temporal change of the local displacement in the image is likely to increase, the determination unit 203 determines the weight coefficient with respect to the image data of each of the frames as illustrated in FIG. 6B. In the example in FIG. 6B, one frame preceding the target frame and one frame following the target frame are reference frames. In other words, in a case where the atmospheric fluctuation parameter is a parameter indicating that the temporal change of the local displacement in the image is likely to increase, the number of the reference frames is less than that in the example in FIG. 6A. Therefore, the noise reduction unit 204 applies the weight coefficients illustrated in FIG. 6B to those frames, and image data obtained by performing weighted averaging on the three frames consisting of the target frame, one reference frame preceding the target frame and one reference frame following the target frame is output as image data of the target frame resulting from the noise reduction processing. In this example, an image in which noise is reduced to some extent and blurring is also reduced is obtained after the noise reduction processing.

Although, in FIGS. 6A and 6B described above, a larger weight coefficient is applied to a frame closer to the target frame, the weight coefficients to be applied may not necessarily be such weight coefficients that change in the above described manner, and the same weight coefficient may be applied to the target frame and the reference frames.

As described above, in the present exemplary embodiment, the target frame is selected from the frames input in time series, and the weighted average operation is performed after the respective weight coefficients are applied to the target frame and the reference frames preceding and following the target frame. The image data obtained by performing the weighted average operation is output as the image data of the target frame on which the noise reduction processing is performed. In other words, the noise reduction unit 204 outputs image data corresponding to the same number of frames as the number of target frames that are selected from the frames input in time series and processed by the noise reduction processing.

As a method for selecting a target frame from a plurality of frames input in time series, for example, a method for selecting each of all the frames only once as a target frame or a reference frame can be used. In this case, the larger the number of the reference frames is, the smaller the number of the frames to be selected as the target frame is. In the present exemplary embodiment, as described above, for example, in a case where the atmospheric fluctuation parameter is a parameter indicating that the change of the local displacement in the image is small, the number of the reference frames is large, and, as a result, the number of the frames to be selected as the target frame is small. In other words, the number of the frames to be output from the noise reduction unit 204 is small. In this case, the number of images (the number of the frames) to be input for the speckle imaging processing to be described below is small, and this results in a reduction in the processing time of the speckle imaging processing. In a case where the processing time can be longer to some extent, more frames may be selected as the target frames, and one reference frame may be used in the noise reduction processing for the plurality of target frames.

In step S505 of the flowchart in FIG. 5, the speckle imaging unit 205 generates (reconstructs) one clear image from a group of the images subjected to the noise reduction processing in the noise reduction unit 204. Here, the time of the speckle imaging processing depends on the number of images to be processed. Thus, when the number of input frames is smaller, i.e., the number of target frames in the noise reduction processing is smaller, the processing time in the speckle imaging unit 205 becomes shorter. The speckle imaging processing will be described in detail below.

In a case where a moving image is to be output, the image acquisition unit 201 may divide the frames input sequentially in time series into a plurality of groups while permitting repetition of the frames. In this case, the parameter acquisition unit 202, the parameter acquisition unit 202, the determination unit 203, the noise reduction unit 204 and the speckle imaging unit 205 perform step S501 to step S505, respectively, for each of those groups, and then integrate pieces of image data output for the groups. Alternatively, after step S501 to step S504 are performed in a manner similar to that described above on the frames input sequentially in time series, the speckle imaging unit 205 may divide the time-series frames processed in step S504 into a plurality of groups while permitting repetition of the frames. In this case, the speckle imaging unit 205 performs the processing in step S505 for each of those groups.

FIG. 7 is a flowchart illustrating a detailed flow of the processing for acquiring the atmospheric fluctuation parameter performed in step S502 of FIG. 5 by the parameter acquisition unit 202 illustrated in FIG. 3. Here, a method will be described in which the parameter acquisition unit 202 estimates the atmospheric fluctuation parameter indicating a weather condition such as a wind velocity, based on the Fourier spectrum of the input image data.

First, in step S701, the image conversion unit 301 performs Fourier transform processing on the image data of each of the input frames, and outputs spectral data based on the result of the Fourier transform processing.

Next, in step S702, the phase extraction unit 302 extracts a phase component at specific coordinates of the spectral data. The specific coordinates may be, for example, one pixel adjacent to the origin. The phase extraction unit 302 performs this processing on the plurality of frames. Time-series data of the phase component is thereby generated. A plurality of specific coordinate pairs may be set, and in this case, a plurality of pieces of time-series data of the phase components is generated.

Next, in step S703, the differential calculation unit 303 calculates a time differential value for the time-series data of the phase component. The time differential value is calculated using a general differential approximation method such as a method using difference between adjacent frames (two-point approximation) or a method using central difference (three-point approximation).

For example, if a Fourier spectrum at two-dimensional frequency coordinates u of an nth frame is $I_n(u)$, a time differential value $D_n(u)$ of the two-point approximation is given by an expression (1). In the expression (1), arg is an operator that extracts the phase component.

$$D_n(u) = \arg[I_{n+1}(u)] - \arg[I_n(u)] \quad (1)$$

Next, in step S704, the statistic calculation unit 304 calculates an amount of statistics for the time differential value. For example, a mean-square value can be used for the amount of statistics.

For example, a mean-square value V(u) for the input of N frames is given by an expression (2).

$$V(u) = \frac{1}{N} \sum_{n=1}^{N-1} D_n(u)^2 \quad (2)$$

In the case where the phase extraction unit 302 extracts the plurality of specific coordinate pairs in step S702, the statistic calculation unit 304 calculates an amount of statistics for the time differential value for each of the coordinate pairs, and determines the average of the calculated amounts of statistics to obtain one amount of statistics.

Next, in step S705, the parameter estimation unit 305 estimates a parameter that affects the atmospheric fluctuation (the atmospheric fluctuation parameter), such as the wind velocity, based on the amount of statistics. Here, for example, when the wind velocity is higher, the mean-square value becomes larger. In the present exemplary embodiment, a look up table (LUT) is created beforehand based on the relationship between the amount of statistics and the atmospheric fluctuation parameter, and the parameter estimation unit 305 selects an atmospheric fluctuation parameter corresponding to the amount of statistics obtained in step S704 from the LUT. Alternatively, the relationship between the amount of statistics and the atmospheric fluctuation parameter may be modeled as a mathematical expression, and the parameter estimation unit 305 may determine the atmospheric fluctuation parameter uniquely from the calculated amount of statistics.

The atmospheric fluctuation parameter is estimated based on the image data by the above-described processing.

Figure 8:
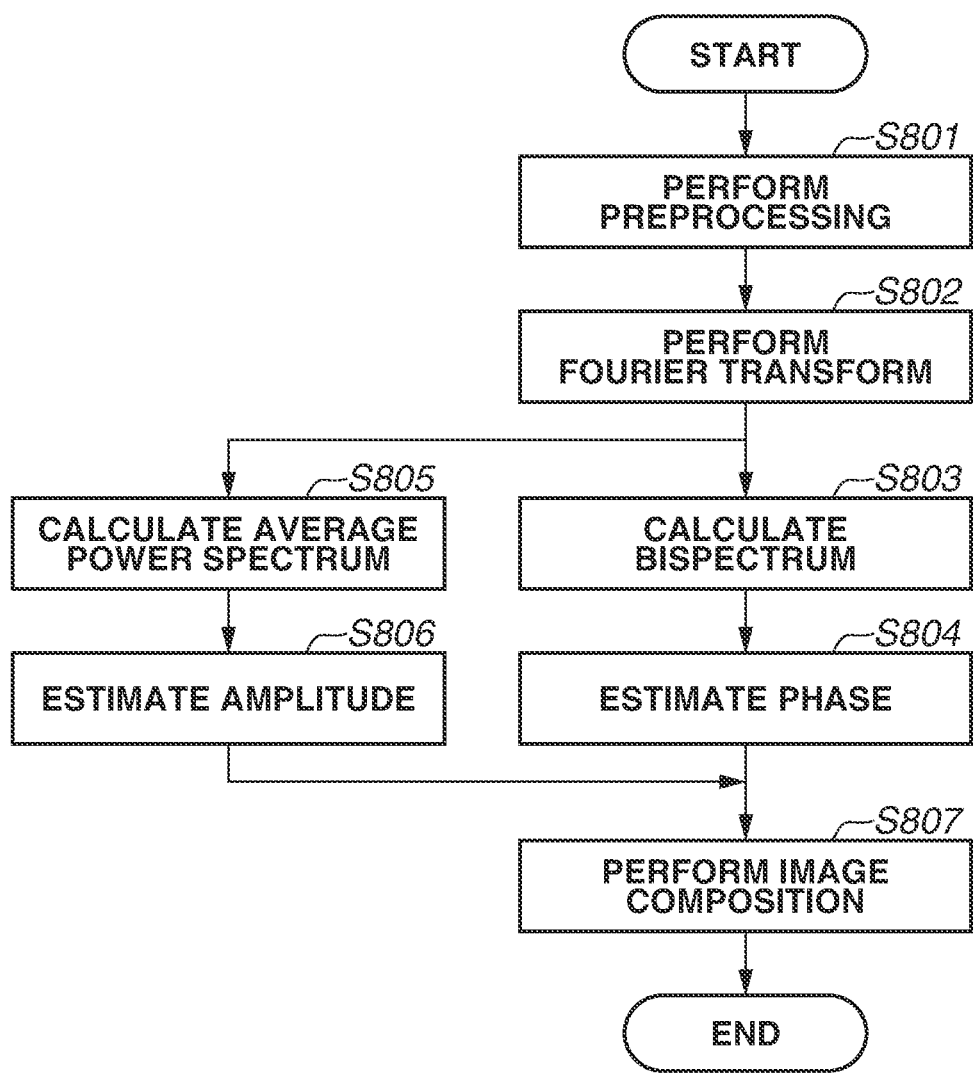
FIG. 8 is a flowchart illustrating processing in the speckle imaging unit.

FIG. 8 is a flowchart illustrating a detailed flow of the speckle imaging processing performed in step S505 of FIG. 5 by the speckle imaging unit 205 illustrated in FIG. 4.

First, in step S801, the preprocessing unit 401 performs preprocessing on the image data after the noise reduction processing. The preprocessing includes any of defective pixel processing, positioning processing, tiling processing, luminance gradient correction processing, and apodization processing. In the defective pixel processing, a pixel without a normal value due to dust in an optical system of the image capturing apparatus or defectiveness of a pixel of the image sensor is detected beforehand, and the value of the detected pixel is replaced with an average value of the values of adjacent pixels after image capturing. In the positioning processing, in a case where inter-frame displacement occurs due to vibration of the image capturing apparatus, displacement of each of the frames relative to a reference frame is estimated and the estimated displacement of each of the frames is corrected. If the displacement is limited to translation, an existing method such as a Fourier correlation method can be used to estimate the displacement. The positioning processing may be re-performed with higher accuracy after the tiling processing. The tiling processing divides the image into sub-regions while permitting a frame repetition. It is desirable that the size of each sub-region be smaller than a range (an isoplanatic patch) in which the influence of the atmospheric fluctuation is assumed to be constant. In the luminance gradient correction processing, a primary plane is fit to the luminance distribution of each of the sub-regions, and the result thereof is deducted from the luminance value of each pixel. The primary plane may be limited to an inclination of 0. In that case, the average luminance value of the sub-regions is deducted. In the apodization processing, a window function is applied to the sub-region for the purpose of preventing a discrepancy that occurs at the boundary when the results of image processing performed on the sub-regions are integrated. It is not necessary to perform all of the foregoing processing, and only necessary processing may be executed.

Next, in step S802, the Fourier transform unit 402 performs the Fourier transform on each piece of the image data subjected to the tiling processing and thereby obtains a Fourier spectrum.

Next, in step S803, the bispectrum calculation unit 403 generates bispectrum data corresponding to each piece of the image data subjected to the tiling processing, using the Fourier spectrum obtained in step S802. For example, a bispectrum $I_{B,n}$ is defined based on a Fourier spectrum $I_n$ of the image data of the nth frame using an expression (3). In the expression (3), each of u and v is a two-dimensional vector indicating coordinates on a frequency plane. The bispectrum is four-dimensional data whereas the Fourier spectrum is two-dimensional data.

$$I_{B,n}(u,v)=I_n(u)\cdot I_n(v)\cdot I_n(-u-v) \quad (3)$$

Next, in step S804, the phase estimation unit 404 estimates a phase component of a Fourier spectrum O of the output image, using the bispectrum data. For example, as discussed in United States Patent Application Publication No. 2004/0005098, this phase component is determined by an expression (4). In the expression (4), the value indicated between the symbols "<" and ">" represents the average of a plurality of frames.

$$\arg[O(u+v)]=\arg[O(u)]+\arg[O(v)]-<I_{B,n}(u,v)> \quad (4)$$

According to the expression (4), if the phase components at three points of (0,0), (1,0), and (0,1) on the frequency plane are determined beforehand, a phase component at arbitrary coordinates can be sequentially determined. For the phase component at the three points, for example, the phase values of the Fourier spectrum of image data obtained by averaging the plurality of frames can be used.

Next, in step S805, the power spectrum calculation unit 405 calculates the average of power spectrums (an average power spectrum A) of the plurality of pieces of image data.

Next, in step S806, the amplitude estimation unit 406 estimates an amplitude of the Fourier spectrum of the output image, using the average power spectrum A obtained in step S805. Specifically, the amplitude of the Fourier spectrum is calculated based on an expression (5), for example, as discussed in "Image Reconstruction Program by Speckle Masking Method" by Kiyoshi Ichimoto and Tomoko Kawate, Technical Reports from Kwasan and Hida Observatories Graduate School of Science, Kyoto University, Vol. 2-1, 2014.

$$|O(u)|=\sqrt{(A(u))}\cdot |T(u)|/S(u) \quad (5)$$

In the expression (5). T is an optical transfer function of the image capturing apparatus, and S is a speckle transfer function. The optical transfer function T may be determined by capturing an image of a point light source beforehand in a state without disturbance such as atmospheric fluctuation, or may be determined based on a numerical calculation using a model. The speckle transfer function S is a function expressing degradation of an image due to atmospheric fluctuation, and a known model may be used, for example, as discussed in "Image Reconstruction Program by Speckle Masking Method" by Kiyoshi Ichimoto and Tomoko Kawate, Technical Reports from Kwasan and Hida Observatories Graduate School of Science, Kyoto University, Vol. 2-1, 2014.

Next, in step S807, the composition unit 407 integrates the phase and the amplitude of the Fourier spectrum O of the output image, and generates output image based on an inverse Fourier transform. In a case where the image data is tiled, the composition unit 407 performs step S802 to step S807 at the position of each of the sub-regions, and the output images obtained for the respective sub-regions are combined, thereby obtaining one output image.

The image in which fluctuation is reduced can be generated by the above-described processing. The information processing apparatus 100 according to the present exemplary embodiment improves an image quality to be obtained in the speckle imaging processing by changing a method and condition for noise reduction processing adaptively with respect to an environment indicated by an atmospheric fluctuation parameter as described above. The data size of the bispectrum is proportional to the square of the image size, and therefore, in the speckle imaging method, the calculation cost is very high and the processing time tends to be long. However, if the number of the frames is reduced based on the number of the atmospheric fluctuation parameters, the processing time of the speckle imaging processing can be reduced.

An example in which the information processing apparatus 100 implements satisfactory fluctuation correction by estimating the atmospheric fluctuation parameter based on displacement information of an input frame will be described below as a second exemplary embodiment. Aspects different from the first exemplary embodiment will be mainly described below.

Figure 9:
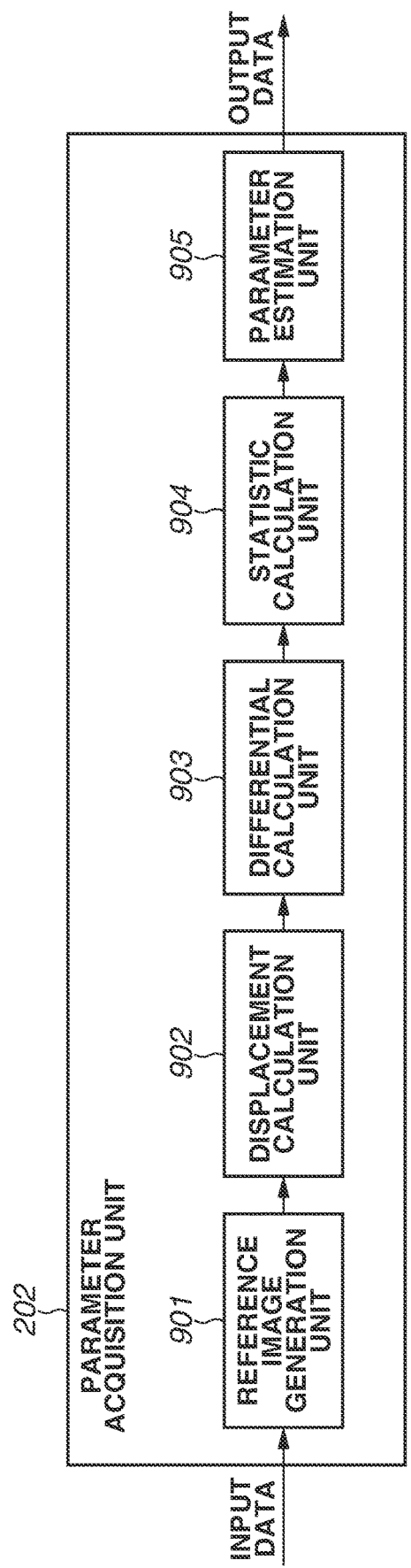
FIG. 9 is a diagram illustrating a functional configuration of a parameter acquisition unit according to a second exemplary embodiment.

The parameter acquisition unit 202 according to the second exemplary embodiment has functions as a reference image generation unit 901, a displacement calculation unit 902, a differential calculation unit 903, a statistic calculation unit 904, and a parameter estimation unit 905, as illustrated in FIG. 9. The CPU 101 reads in a program stored in the ROM 103, and executes the read program, so that the function in each of the units illustrated in FIG. 9 is implemented. The information processing apparatus 100 may include a dedicated processing circuit corresponding to each of the units.

Figure 10:
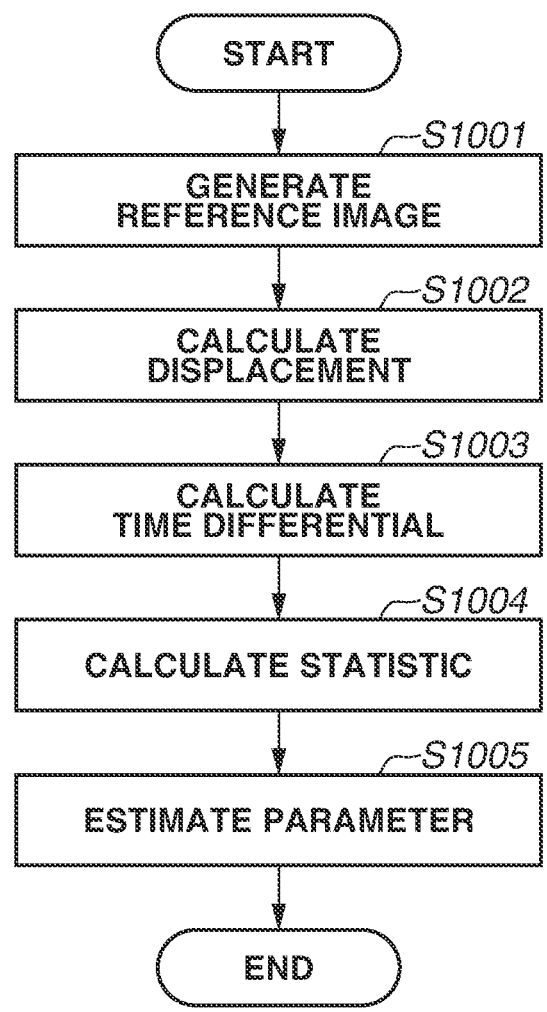
FIG. 10 is a flowchart illustrating processing in the parameter acquisition unit according to the second exemplary embodiment.

FIG. 10 is a flowchart illustrating a flow of processing in the parameter acquisition unit 202 according to the second exemplary embodiment. The processing of the flowchart illustrated in FIG. 10 is the above-described processing performed in step S502 in FIG. 5, and other steps are similar to those described above and thus will not be described.

First, in step S1001, the reference image generation unit 901 generates one reference image from input image data of a plurality of frames. The reference image is generated by, for example, giving an average value or median value of pixel values between the frames to each pixel. In the reference image thus obtained, local deformation in the image due to atmospheric fluctuation is reduced compared to the input image data.

Next, in step S1002, the displacement calculation unit 902 calculates local displacement with respect to the reference image, for each piece of the input image data. The displacement for each pixel can be calculated using a generally known technique such as an optical flow method or a B-spline method. The displacement calculation unit 902 performs this processing on each of the input frames, so that time-series data of the displacement is generated. Further, a plurality of coordinate pairs for calculating the displacement may be set. In that case, a plurality of pieces of time-series data of the displacement is generated.

Next, in step S1003, the differential calculation unit 903 calculates a time differential value for the time-series data of the displacement. For example, if displacement at two-dimensional image coordinates x in an nth frame is $T_n(x)$, a time differential value $D_n(x)$ in two-point approximation is given by an expression (6).

$$D_n(x)=T_{n+1}(x)-T_n(x) \quad (6)$$

Next, in step S1004, the statistic calculation unit 904 calculates an amount of statistics for the time differential value.

Next, in step S1005, the parameter estimation unit 905 estimates an atmospheric fluctuation parameter, such as a wind velocity, based on the amount of statistics.

The parameter acquisition unit 202 according to the second exemplary embodiment can estimate the atmospheric fluctuation parameter based on the input image data by performing the above-described processing.

An example in which the information processing apparatus 100 implements satisfactory fluctuation correction based on observation data of weather information will be described below as a third exemplary embodiment. Aspects different from the first exemplary embodiment will be mainly described below.

A flow of processing in the information processing apparatus 100 according to the third exemplary embodiment is similar to the flow of processing in the flowchart illustrated in FIG. 5. In the third exemplary embodiment, however, the parameter acquisition unit 202 acquires an atmospheric fluctuation parameter from observation data sent from an external observation device in step S502. For example, the parameter acquisition unit 202 acquires data observed by the observation device, such as an anemometer or thermometer, installed between the image capturing apparatus and an object as the atmospheric fluctuation parameter, and transmits the acquired data to the determination unit 203. Since the observation data continuously acquired and accumulated for a time period including an image-capturing timing, the parameter acquisition unit 202 may extract observation data at the image-capturing timing from the accumulated observation data by referring to the image-capturing timing. Alternatively, the image capturing apparatus and the observation device may be connected, and the observation data may be acquired simultaneously with image-capturing. Alternatively, the parameter acquisition unit 202 may acquire position information from a Global Positioning System (GPS) device attached to the image capturing apparatus, and output a value determined by referring to the acquired position information and geographic information as the atmospheric fluctuation parameter. For example, the parameter acquisition unit 202 extracts a factor (such as a lake or a road) that can increase the fluctuation within an imaging visual field determined based on an imaging position and direction as well as the image capturing apparatus (a focal length and a sensor size). Subsequently, the parameter acquisition unit 202 calculates a numerical value corresponding to the intensity of a fluctuation that can be assumed from the area and the distance of the extracted factor, as the atmospheric fluctuation parameter. The parameter acquisition unit 202 may select and use only one observation device located within the imaging visual field from among a plurality of observation devices by acquiring the position information. In the third exemplary embodiment, the determination unit 203 determines the number of reference frames and a weight coefficient based on the atmospheric fluctuation parameter thus obtained, using a LUT or model type.

As described above, the information processing apparatus 100 according to each of the first to third exemplary embodiments of the present invention can generate a high-quality image in which the influence of noise included in the input frame on the image quality is reduced, and the processing time can be reduced thereby.

In each of the above-described first to third exemplary embodiments, the noise reduction unit 204 performs the noise reduction processing corresponding to the method and condition for noise reduction processing determined by the determination unit 203. Here, for example, the noise reduction unit 204 may include one weighted average circuit that performs weighted averaging on the plurality of frames, and the determination unit 203 may change the settings of the number of the reference frames and the weight coefficient. Alternatively, the noise reduction unit 204 may include a plurality of weighted average circuits corresponding to the different numbers of reference frames and the different weight coefficients and use a weighted average circuit corresponding to the number of reference frames and the weight coefficient determined by the determination unit 203.

Although, in each of the above-described exemplary embodiments, fluctuation correction processing performed on an input image captured by an image capturing apparatus such as a monitoring camera has been described as an example, the input image is not limited to an image captured by the monitoring camera. The input image may be, for example, an image obtained by a digital camera, any of various information terminals, such as a personal computer, a tablet terminal, a smartphone, and a portable gaming device, each having a digital camera function, a camcorder, an on-vehicle camera, or an industrial camera.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-118376, filed Jun. 26, 2019, which is hereby incorporated by reference herein in its entirety.

What is claimed is:

1. An image processing apparatus comprising:
   at least one memory; and
   at least one processor functioning by executing instructions stored in the at least one memory as the following units:
      an acquisition unit configured to acquire a parameter about atmospheric fluctuation;
      a determination unit configured to determine a method and condition for noise reduction processing;
      a processing unit configured to perform, on input image data, noise reduction processing corresponding to the determined method and condition for noise reduction processing; and
      a generation unit configured to generate image data corrected by a speckle imaging method, based on a plurality of pieces of image data on which the noise reduction processing has been performed,
   wherein the determination unit determines the method and condition for noise reduction processing based on the parameter.

2. The image processing apparatus according to claim 1, wherein the input image data is image data of frames input in time series, and
   wherein the processing unit performs the noise reduction processing by performing weighted averaging on image data of a plurality of frames selected from the frames input in time series.

3. The image processing apparatus according to claim 2, wherein the determination unit determines a number of frames to be used for the weighted averaging and a weight coefficient to be applied to image data of each frame, based on the parameter.

4. The image processing apparatus according to claim 3, wherein the determination unit determines a smaller number of frames to be used for the weighted averaging when a temporal change in displacement due to atmospheric fluctuation indicated by the parameter is increased.

5. The image processing apparatus according to claim 3, wherein the determination unit determines a smaller number of frames to be used for the weighted averaging when displacement due to atmospheric fluctuation indicated by the parameter is increased.

6. The image processing apparatus according to claim 2, wherein the processing unit selects a target frame from the frames input in time series, and performs the weighted averaging on image data of the selected target frame and image data of a plurality of reference frames preceding and following the selected target frame, and
   wherein all the frames input in time series are each selected once as the target frame or the reference frame.

7. The image processing apparatus according to claim 2, wherein the processing unit divides the frames input in time series into a plurality of groups while permitting repetition of the frames, and performs the noise reduction processing for each of the groups, and
   wherein the generation unit generates the image data corrected by the speckle imaging method, based on image data of a plurality of frames on which the noise reduction processing for each of the groups has been performed.

8. The image processing apparatus according to claim 2, wherein the generation unit divides the frames on which the noise reduction processing has been performed into a plurality of groups while permitting repetition of the frames, and generates the image data corrected by the speckle imaging method based on image data of a plurality of frames in each of the groups.

9. The image processing apparatus according to claim 1, wherein the acquisition unit calculates the parameter based on a temporal change of a phase component of a Fourier spectrum of input image data.

10. The image processing apparatus according to claim 1, wherein the acquisition unit generates a reference image from a plurality of pieces of image data, calculates displacement in each of the plurality of pieces of image data relative to the reference image, and calculates the parameter based on a temporal change of the displacement relative to the reference image.

11. The image processing apparatus according to claim 1, wherein the acquisition unit acquires information about at least one of a wind velocity, a temperature, and a geographic environment as the parameter from an observation device.

12. An image processing method to be executed by an image processing apparatus, the image processing method comprising:

acquiring a parameter about atmospheric fluctuation;

determining a method and condition for noise reduction processing;

performing, on input image data, noise reduction processing corresponding to the determined method and condition for noise reduction processing; and generating image data corrected by a speckle imaging method, based on a plurality of pieces of image data on which the noise reduction processing has been performed, wherein the method and condition for noise reduction processing is determined based on the parameter.

13. A non-transitory storage medium storing a program causing a computer to execute an image processing method, the image processing method comprising:

acquiring a parameter about atmospheric fluctuation;

determining a method and condition for noise reduction processing;

performing, on input image data, noise reduction processing corresponding to the determined method and condition for noise reduction processing; and generating image data corrected by a speckle imaging method, based on a plurality of pieces of image data on which the noise reduction processing has been performed, wherein the method and condition for noise reduction processing is determined based on the parameter.

\* \* \* \* \*